(12) United States Patent
Gong

(10) Patent No.: US 10,254,867 B2
(45) Date of Patent: Apr. 9, 2019

(54) TOUCH PANEL AND DISPLAY DEVICE

(71) Applicant: Wuhan China Star Optoelectronics Technology Co., Ltd., Wuhan, Hubei (CN)

(72) Inventor: Qiang Gong, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/326,235

(22) PCT Filed: Dec. 27, 2016

(86) PCT No.: PCT/CN2016/112271
§ 371 (c)(1),
(2) Date: Jan. 13, 2017

(87) PCT Pub. No.: WO2018/082170
PCT Pub. Date: May 11, 2018

(65) Prior Publication Data
US 2018/0224982 A1 Aug. 9, 2018

(30) Foreign Application Priority Data
Nov. 2, 2016 (CN) .......................... 2016 1 0945638

(51) Int. Cl.
G06F 3/041 (2006.01)
G02F 1/1333 (2006.01)
G06F 3/0488 (2013.01)
G06F 3/044 (2006.01)

(52) U.S. Cl.
CPC ........ G06F 3/0412 (2013.01); G02F 1/13338 (2013.01); G06F 3/0416 (2013.01); G06F 3/04883 (2013.01); *G06F 3/044* (2013.01)

(58) Field of Classification Search
CPC .... G06F 3/0412; G06F 3/044; G06F 3/04883; G02F 1/13338
See application file for complete search history.

(56) References Cited

U.S. PATENT DOCUMENTS

| | | | | |
|---|---|---|---|---|
| 2012/0105338 A1* | 5/2012 | Lin | ....................... | G06F 3/0416 345/173 |
| 2016/0041664 A1* | 2/2016 | Qin | ........................ | G06F 3/044 345/173 |
| 2016/0259455 A1* | 9/2016 | Li | ........................ | G06F 3/0412 |
| 2016/0300523 A1* | 10/2016 | Tan | ....................... | G06F 3/0412 |

* cited by examiner

*Primary Examiner* — Ibrahim A Khan

(57) ABSTRACT

The technical field of touch panel is related to. A touch panel provided herein includes a touch area and a peripheral area. A first driving circuit and a GOA circuit are provided in the peripheral area. The first driving circuit and the GOA circuit include same stage transmission units, and share a same driving signal. The first driving circuit is sandwiched in the GOA circuit, and thus a layout space of the first driving circuit can be saved, which can facilitate realization of narrow frame design. Sensor pads in the touch area are arranged in a rectangular array, and a first sensor pad and a last sensor pad of each row of sensor pads are connected with the first driving circuit respectively. Two adjacent sensor pads are connected by a first connecting line or a second connecting line. A display device including the touch panel is further provided.

16 Claims, 4 Drawing Sheets

TOUCH PANEL AND DISPLAY DEVICE

CROSS-REFERENCE TO RELATED APPLICATIONS

The present application claims priority to Chinese patent application CN201610945638.1, entitled "Touch panel and display device", filed on Nov. 2, 2016, the entire contents of which are incorporated herein by reference.

FIELD OF THE INVENTION

The present disclosure relates to the technical field of in-cell touch panels, and particularly to a touch panel and a display device.

BACKGROUND OF THE INVENTION

An in-cell touch panel is a panel that integrates touch function into a thin film transistor liquid crystal display (TFT-LCD) array process, whereby a thin panel and even a thin display device can be realized. A mutual capacitive in-cell panel is one kind of in-cell touch panel, which includes a sensor pad, a first connecting line, and a second connecting line. In a commonly used mutual capacitive in-cell touch panel, as shown in FIG. 1, sensor pads 10 are provided between a first edge 13 and a second edge 14; two adjacent sensor pads are connected by a first connecting line 11 or a second connecting line 12; a Gate Driver On Array (GOA) circuit 17 and first signal lines 18 are arranged between the first edge 13 and a first frame 15, and between the second edge 14 and a second frame 16; the sensor pads 10 are directly connected to an integrated circuit (IC) or a Flexible Printed Circuit (FPC) via the first signal lines 18. In the touch panel with this design, since the GOA circuit 17 and a large number of first signal lines 18 are arranged between the first edge 13 and the first frame 15, and between the second edge 14 and the second frame 16, the touch panel has a wide frame, and a narrow frame design of the panel cannot be easily realized.

SUMMARY OF THE INVENTION

In view of problem of the wide frame in the prior art, the present disclosure provides a touch panel and a display device in which a narrow frame design can be easily realized.

The touch panel provided by the present disclosure has a touch area and a peripheral area. The touch area has a first edge and a second edge which are oppositely arranged, and the peripheral area has a first frame and a second frame which are oppositely arranged outside the first edge and the second edge. An extending direction of the first edge and an extending direction of the first frame are parallel to each other. The peripheral area comprises an area between the first edge and the first frame and an area between the second edge and the second frame, and the touch area comprises an area between the first edge and the second edge. The first edge extends in a second direction, and a first direction is perpendicular to the second direction.

The touch panel includes a sensor pad, a first connecting line and a second connecting line which are arranged in the touch area. The peripheral area is provided with a first driving circuit and a GOA circuit. The first driving circuit and the GOA circuit are provided between the first edge and the first frame, and between the second edge and the second frame. The first connecting line and the second connecting line are used for connecting adjacent sensor pads.

In the touch panel provided herein, no first signal line is provided between the first edge and the first frame, or between the second edge and the second frame, so that a distance between the first edge and the first frame, and between the second edge and the second frame can be reduced to a certain extent, which can facilitate realization of narrow panel design.

As a further improvement on the present disclosure, the first driving circuit comprises a stage transmission unit and a first output unit, and the GOA circuit comprises a stage transmission unit and a second output unit. The first driving circuit is sandwiched in the GOA circuit, and the first driving circuit shares a first driving signal with the GOA circuit.

Since both the first driving circuit and the GOA circuit comprise stage transmission units, the first diving circuit can share the first driving signal with the GOA circuit. In this manner, a number of output pins of the IC can be reduced. At the same time, the first driving circuit is sandwiched in the GOA circuit, and thus a layout space of the first driving circuit can be saved, which facilitates the design of narrow frame of the touch panel.

In one preferred embodiment, a number of GOA circuits between every two adjacent first driving circuits is equal. In this manner, a clear layout of the circuit can be ensured, which can facilitate error diagnosis of the circuit.

In one preferred embodiment, the sensor pads are arranged in a rectangular array. Rows of the rectangular array extend in a first direction, and columns of the rectangular array extend in a second direction. The second connecting line connects the adjacent sensor pads arranged in a same column in the second direction, and the first connecting line connects the adjacent sensor pads arranged in a same row in the first direction.

Furthermore, a first sensor pad and a last sensor pad of each row of sensor pads are connected to the first driving circuit, respectively. In this manner, the first signal line that is originally provided between the first edge and the first frame, and between the second edge and the second frame is replaced by the first driving circuit, and the sensor pads of each row are driven by the first driving circuit.

The present disclosure, on the basis of the aforesaid touch panel, further provides a display device, which comprises the touch panel provided herein.

BRIEF DESCRIPTION OF THE DRAWINGS

The present disclosure will be described in more detail below by way of embodiments and with reference to the accompanying drawings. In the drawings.

Figure 1:
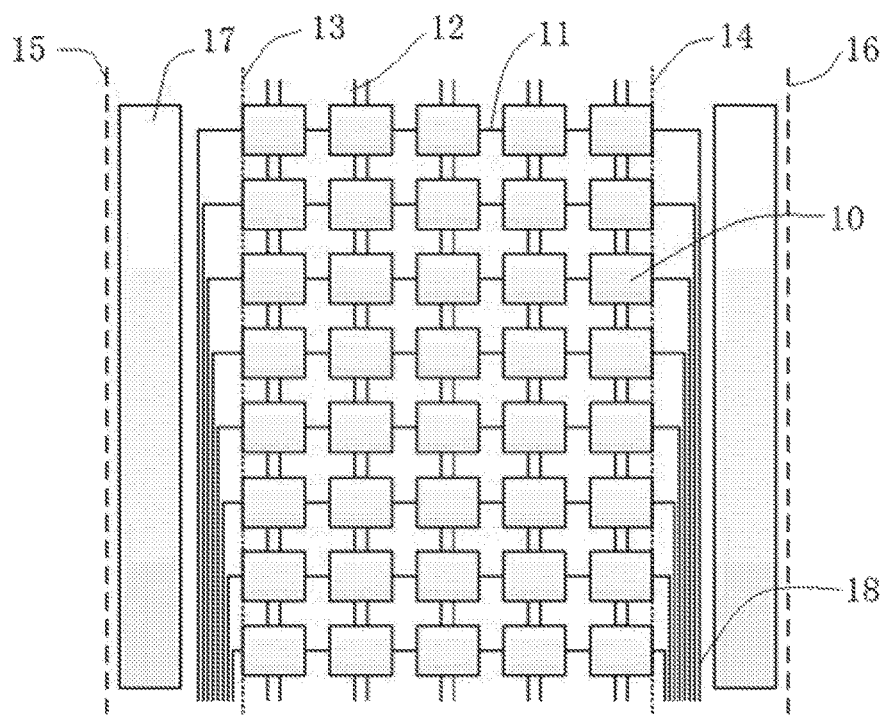
FIG. 1 schematically shows a structure of a touch panel in the prior art.

In the drawings, the same components are represented by the same reference signs, and the size of each component does not represent the actual size of the corresponding component.

DETAILED DESCRIPTION OF THE EMBODIMENTS

Figure 2:
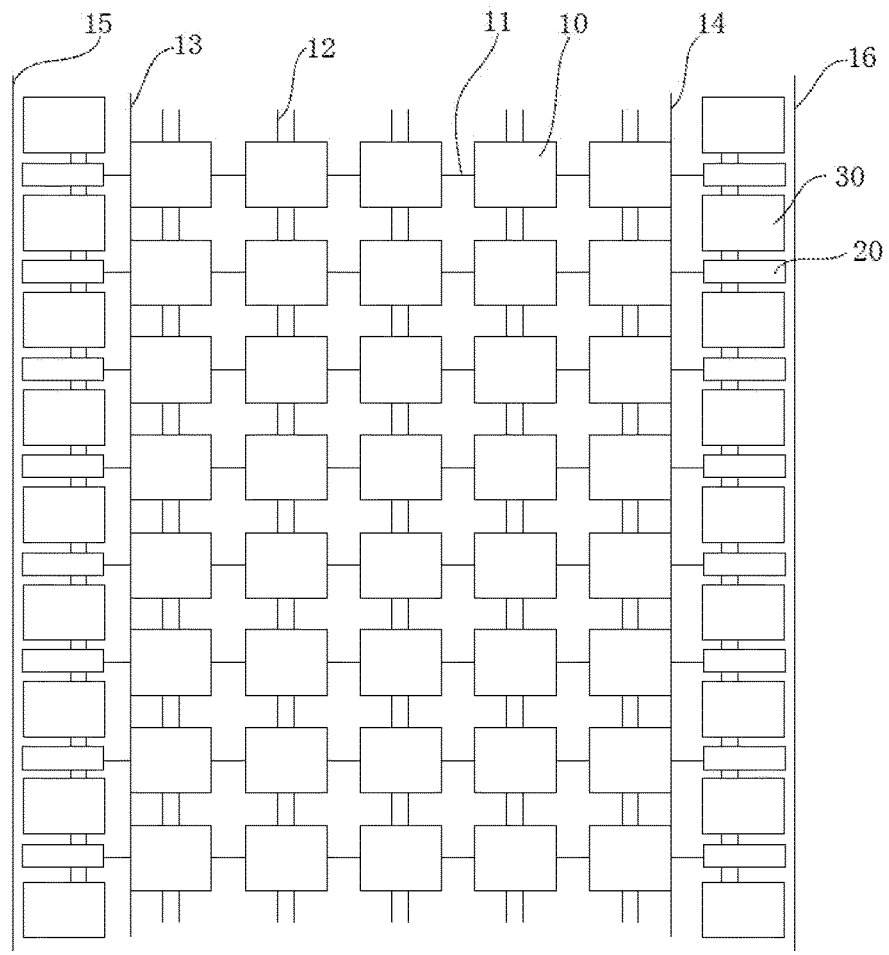
FIG. 2 schematically shows a structure of a touch panel according to the present disclosure.

As shown in FIG. 2, a touch panel of the present disclosure has a touch area and a peripheral area. The touch area has a first edge 13 and a second edge 14 which are oppositely arranged. A first frame 15 is arranged on an outer side of the first edge 13, and a second frame 16 is arranged on an outer side of the second edge 14. An extending direction of the first edge 13 is the same as an extending direction of the first frame 15. An area between the first edge 13 and the second edge 14 is the touch area. An area between the first edge 13 and the first frame 15, and an area between the second edge 14 and the second frame 16 constitute the peripheral area. An extending direction of the first edge 13 is the second direction, and a direction perpendicular to the second direction is a first direction.

Figure 3:
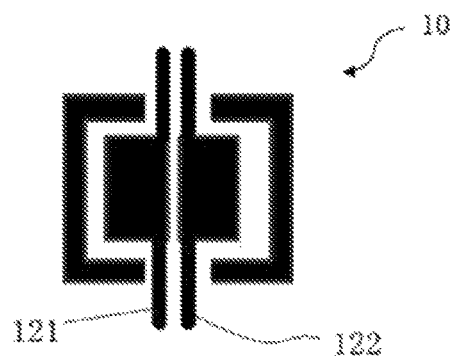
FIG. 3 schematically shows a structure of a sensor pad in the prior art.

Sensor pads 10 are provided in the touch area. The sensor pads 10 are arranged in a rectangular array. Rows of the rectangular array extend in a first direction, and columns of the rectangular array extend in a second direction. A first connecting line 11 connects the adjacent sensor pads 10 arranged in a same row in the first direction, and a second connecting line 12 connects the adjacent sensor pads 10 arranged in a same column in the second direction. It can be seen from a structure of the sensor pad as shown in FIG. 3 that, the second connecting line 12 is composed of two lines 121 and 122 which are parallel to each other.

Figure 4:
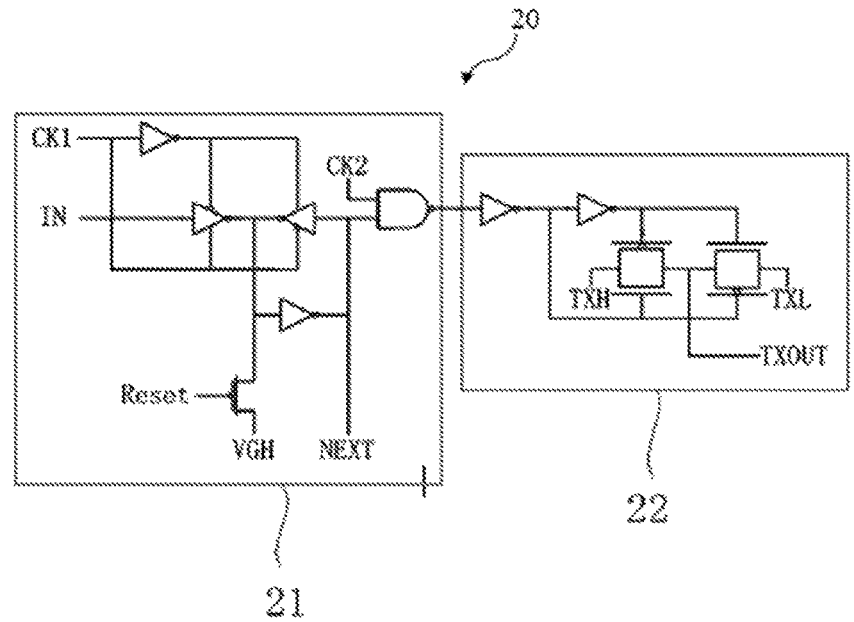
FIG. 4 schematically shows a first driving circuit.
Figure 5:
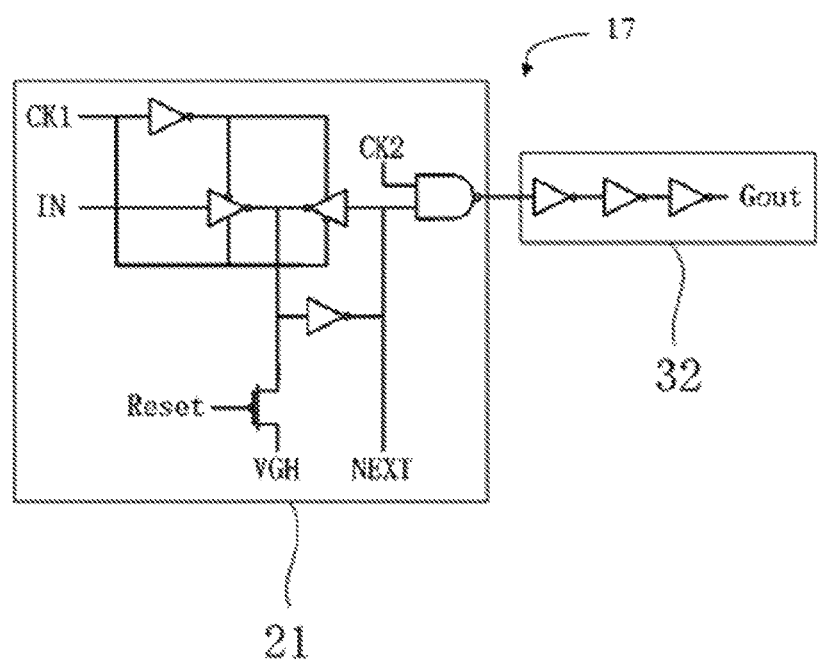
FIG. 5 schematically shows a GOA circuit.

A first driving circuit 20 and a GOA circuit combination 30 which includes a plurality of GOA circuits 17 are arranged in the peripheral region, i.e. the first driving circuit 20 and the GOA circuit combination 30 are arranged between the first edge 13 and the first frame 15, and the first driving circuit 20 and the GOA circuit combination 30 are arranged between the second edge 14 and the second frame 16. As shown in FIG. 4, the first driving circuit 20 includes a stage transmission unit (LATCH) 21 and a first output unit (Tx) 22. As shown in FIG. 5, the GOA circuit 17 includes the stage transmission unit (LATCH) 21 and a second output unit (32). Since the first driving circuit 20 and the GOA circuit 17 have the same stage transmission unit 21, the first driving circuit 20 can use the common first driving signal CK1 with the GOA circuit 17. In this manner, a number of driving signals can be reduced. The first driving circuit 20 is sandwiched in the GOA circuit 17, and thus a layout space of the first driving circuit 20 can be saved, which can facilitate realization of narrow frame design. A first sensor pad 10 and a last sensor pad 10 of each row of sensor pads are connected to the first driving circuit 20 through a third connecting line 19, respectively. The driving scanning of the sensor pad 10 is realized by the first driving circuit 20.

As shown in FIG. 4, the first driving circuit 20 includes the stage transmission unit 21 and the first output unit 22. The stage transmission unit 21 has functions of shift registering and logic processing. The stage transmission unit 21 is responsible for processing a received clock signal and a stage transmission signal, and feeding a processing result to the first output unit 22. The first output unit 22 outputs a corresponding TXH or TXL signal based on a received feedback signal.

The GOA circuit 17 in FIG. 5 is a is a common GOA circuit, which includes the same stage transmission unit 21 as that in the first driving circuit 20 and the second output unit 32. The second output unit 32 is a gate output unit. The stage transmission unit 21 is responsible for processing a received clock signal and a stage transmission signal, and feeding a processing result to the second output unit 32. The second output unit 32 outputs a corresponding VGH or VGL signal according to a received feedback signal to realize progressive scanning of a gate.

Figure 6:
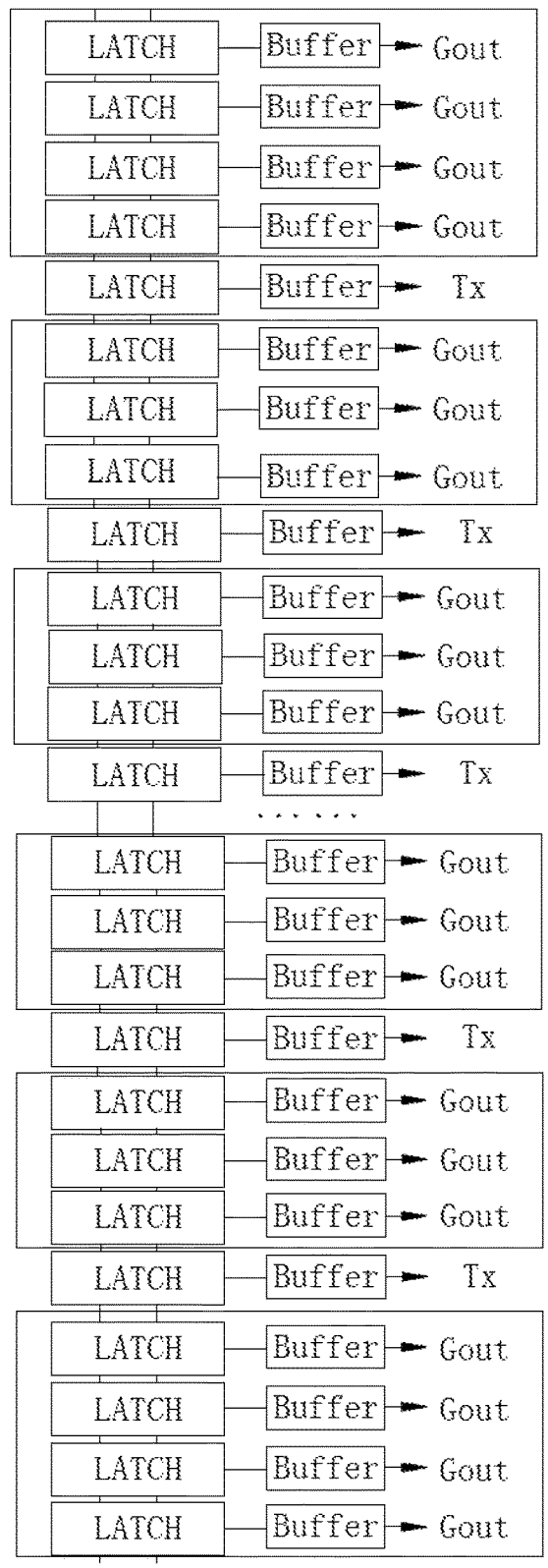
FIG. 6 schematically shows a structure that the first driving circuit is sandwiched in the GOA circuit.

Preferably, a number of GOA circuits 17 between every two adjacent first driving circuits 20 is equal. Since the touch panel contains a plurality of first driving circuits 20 and a plurality of GOA circuits 17, specific arrangement of the first driving circuits 20 in the GOA circuit 17 is provided herein. It is assumed that there are m GOA circuits 17 and n first driving circuits 20 in the peripheral area between the first edge 13 and the first border 15, m is divided into equal n+1 groups (if there is a remainder, the remainder is divided into a first group and a last group), and then the n first driving circuits 20 are distributed at the end of each group of the GOA circuits. According to this embodiment, it is assumed that there are 29 GOA circuits 17 and 8 first driving circuits 20 in the peripheral area between the first edge 13 and the first border 15, 29 are divided into equal 9 groups, and the remainder is divided into a first group and a last group to obtain a circuit as shown in FIG. 6. The first group and the last group each contain 4 GOA circuits 17, and other groups each contain 3 GOA circuits 17. An output signal Tx Out of the first driving circuit 20 is connected to the corresponding sensor pad 10.

At last, it should be noted that, the above embodiments are only used for illustrating, rather than restricting the present disclosure. The present disclosure is illustrated in detail in combination with preferred embodiments hereinabove, but it can be understood that, the embodiments disclosed herein can be amended or substituted without departing from the protection scope of the present disclosure. The protection scope of the present disclosure shall be determined by the scope as defined in the claims.

The invention claimed is:

1. A touch panel, comprising a touch area and a peripheral area,
wherein the touch area has a first edge and a second edge which are oppositely arranged, and the peripheral area has a first frame and a second frame which are oppositely arranged outside the first edge and the second edge;
wherein an extending direction of the first edge and an extending direction of the first frame are parallel to each other;
wherein the peripheral area comprises an area between the first edge and the first frame and an area between the second edge and the second frame, and the touch area comprises an area between the first edge and the second edge;
wherein the first edge extends in a second direction, and a first direction is perpendicular to the second direction;
wherein the touch panel comprises a sensor pad, a first connecting line and a second connecting line which are provided in the touch area;
wherein the peripheral area is provided with a first driving circuit and a GOA circuit, and the first driving circuit and the GOA circuit are provided between the first edge and the first frame, and between the second edge and the second frame;
wherein the first connecting line and the second connecting line are used for connecting adjacent sensor pads; and
wherein if there are m GOA circuits and n first driving circuits in the peripheral area between the first edge and the first border, m is divided into equal n+1 groups, and if there is a remainder, the remainder is divided into a first group and a last group, and then the n first driving circuits are distributed at the end of each group of the GOA circuits.

2. The touch panel according to claim 1, wherein the first driving circuit comprises a stage transmission unit and a first output unit, and the GOA circuit comprises a stage transmission unit and a second output unit.

3. The touch panel according to claim 2, wherein the first driving circuit is sandwiched in the GOA circuit, and the first driving circuit shares a first driving signal with the GOA circuit.

4. The touch panel according to claim 1, wherein the sensor pads are arranged in a rectangular array; and
wherein rows of the rectangular array extend in a first direction, and columns of the rectangular array extend in a second direction.

5. The touch panel according to claim 4, wherein the second connecting line connects the adjacent sensor pads arranged in a same column in the second direction.

6. The touch panel according to claim 4, wherein the first connecting line connects the adjacent sensor pads arranged in a same row in the first direction.

7. The touch panel according to claim 1, wherein a first sensor pad and a last sensor pad of each row of sensor pads are respectively connected with the first driving circuit.

8. The touch panel according to claim 5, wherein a first sensor pad and a last sensor pad of each row of sensor pads are respectively connected with the first driving circuit.

9. A display device, comprising a touch panel, wherein the touch panel has a touch area and a peripheral area,
wherein the touch area has a first edge and a second edge which are oppositely arranged, and the peripheral area has a first frame and a second frame which are oppositely arranged outside the first edge and the second edge;
wherein an extending direction of the first edge and an extending direction of the first frame are parallel to each other;
wherein the peripheral area comprises an area between the first edge and the first frame and an area between the second edge and the second frame, and the touch area comprises an area between the first edge and the second edge;
wherein the first edge extends in a second direction, and a first direction is perpendicular to the second direction;
wherein the touch panel comprises a sensor pad, a first connecting line and a second connecting line which are provided in the touch area;
wherein the peripheral area is provided with a first driving circuit and a GOA circuit, and the first driving circuit and the GOA circuit are provided between the first edge and the first frame, and between the second edge and the second frame;
wherein the first connecting line and the second connecting line are used for connecting adjacent sensor pads; and
wherein if there are m GOA circuits and n first driving circuits in the peripheral area between the first edge and the first border, m is divided into equal n+1 groups, and if there is a remainder, the remainder is divided into a first group and a last group, and then the n first driving circuits are distributed at the end of each group of the GOA circuits.

10. The display device according to claim 9, wherein the first driving circuit comprises a stage transmission unit and a first output unit, and the GOA circuit comprises a stage transmission unit and a second output unit.

11. The display device according to claim 9, wherein the first driving circuit is sandwiched in the GOA circuit, and the first driving circuit shares a first driving signal with the GOA circuit.

12. The display device according to claim 9, wherein the sensor pads are arranged in a rectangular array; and
wherein rows of the rectangular array extend in the first direction, and columns of the rectangular array extend in the second direction.

13. The display device according to claim 11, wherein the second connecting line connects the adjacent sensor pads arranged in a same column in the second direction.

14. The display device according to claim 9, wherein the first connecting line connects the adjacent sensor pads arranged in a same row in the first direction.

15. The display device according to claim 9, wherein a first sensor pad and a last sensor pad of each row of sensor pads are respectively connected with the first driving circuit.

16. The display device according to claim 12, wherein a first sensor pad and a last sensor pad of each row of sensor pads are respectively connected with the first driving circuit.

* * * * *